(12) United States Patent
Kingston

(10) Patent No.: US 9,794,777 B2
(45) Date of Patent: Oct. 17, 2017

(54) VARYING DEVICE IDENTITIES

(75) Inventor: Simon James Kingston, Cambridge (GB)

(73) Assignee: QUALCOMM TECHNOLOGIES INTERNATIONAL, LTD., San Diego, CA (US)

( * ) Notice: Subject to any disclaimer, the term of this patent is extended or adjusted under 35 U.S.C. 154(b) by 1099 days.

(21) Appl. No.: 12/161,894

(22) PCT Filed: Nov. 1, 2006

(86) PCT No.: PCT/GB2006/004076
§ 371 (c)(1),
(2), (4) Date: Oct. 10, 2008

(87) PCT Pub. No.: WO2007/085780
PCT Pub. Date: Aug. 2, 2007

(65) Prior Publication Data
US 2009/0219974 A1    Sep. 3, 2009

(30) Foreign Application Priority Data

Jan. 24, 2006 (GB) .................................. 0601403.9

(51) Int. Cl.
*H04B 1/69* (2011.01)
*H04W 8/22* (2009.01)
*H04W 76/02* (2009.01)
*H04L 29/12* (2006.01)
*H04B 1/7183* (2011.01)
*H04W 8/26* (2009.01)

(52) U.S. Cl.
CPC ............ *H04W 8/22* (2013.01); *H04B 1/7183* (2013.01); *H04L 29/1232* (2013.01); *H04W 8/26* (2013.01); *H04W 76/025* (2013.01)

(58) Field of Classification Search
CPC ....... H04W 8/22; H04W 76/025; H04W 8/26; H04L 29/1232; H04B 1/7183
USPC ........................................... 370/252; 455/522
See application file for complete search history.

(56) References Cited

U.S. PATENT DOCUMENTS

| 6,798,742 B1 * | 9/2004 | Mawhinney et al. | ........ 370/230 |
| 6,842,607 B2 * | 1/2005 | Godfrey et al. | ............. 455/41.2 |
| 6,898,187 B2 * | 5/2005 | Perlman et al. | .............. 370/252 |
| 7,050,402 B2 * | 5/2006 | Schmidl et al. | .............. 370/252 |

(Continued)

FOREIGN PATENT DOCUMENTS

| EP | 1608191 A | 12/2005 |
| JP | 2003110579 A | 4/2003 |

(Continued)

OTHER PUBLICATIONS

International Search Report and Written Opinion for PCT/GB2006/004076, filed Nov. 1, 2006.

(Continued)

*Primary Examiner* — Brian O'Connor
(74) *Attorney, Agent, or Firm* — Paradice and Li LLP

(57) ABSTRACT

A communication device comprises a memory for storing a device identity; a data transmitter for supporting communication links with other devices; and a communication controller, wherein the controller is configured to periodically vary the stored device identity and to cause the data transmitter to periodically transmit the stored device identity so that the device can be identified.

14 Claims, 1 Drawing Sheet

(56) References Cited

U.S. PATENT DOCUMENTS

| | | | |
|---|---|---|---|
| 7,091,852 B2* | 8/2006 | Mason et al. | 340/539.13 |
| 7,194,283 B2* | 3/2007 | Kardach et al. | 455/552.1 |
| 7,245,602 B2* | 7/2007 | Skubic et al. | 370/338 |
| 7,352,998 B2* | 4/2008 | Palin et al. | 455/41.2 |
| 7,379,015 B2* | 5/2008 | Workman | 342/126 |
| 7,454,171 B2* | 11/2008 | Palin et al. | 455/41.2 |
| 7,499,674 B2* | 3/2009 | Salokannel et al. | 455/69 |
| 7,610,057 B2* | 10/2009 | Bahl et al. | 455/522 |
| 7,676,194 B2* | 3/2010 | Rappaport | 455/11.1 |
| 7,697,893 B2* | 4/2010 | Kossi et al. | 455/41.2 |
| 7,702,284 B2* | 4/2010 | Palin et al. | 455/67.11 |
| 2002/0085719 A1 | 7/2002 | Crosbie | |
| 2004/0111494 A1 | 6/2004 | Kostic | |
| 2005/0059345 A1* | 3/2005 | Palin et al. | 455/41.2 |
| 2006/0030265 A1* | 2/2006 | Desai et al. | 455/41.2 |
| 2006/0064507 A1 | 3/2006 | Tsuruoka et al. | |
| 2006/0274704 A1* | 12/2006 | Desai et al. | 370/338 |

FOREIGN PATENT DOCUMENTS

| | | | |
|---|---|---|---|
| JP | 2004297711 A | 10/2004 | |
| JP | 2005109752 A | 4/2005 | |
| WO | WO 96/22000 A | 7/1996 | |
| WO | WO 02/082742 A | 10/2002 | |
| WO | 2005022394 A1 | 3/2005 | |

OTHER PUBLICATIONS

JP Office Action issued Dec. 6, 2011 in JP Application No. 2008-551846.

* cited by examiner

VARYING DEVICE IDENTITIES

CROSS REFERENCE TO RELATED APPLICATIONS

This application is a 35 U.S.C. §371 national phase application of PCT International Application No. PCT/GB2006/004076, filed 1 Nov. 2006, by applicant Cambridge Silicon Radio Limited, entitled "VARYING DEVICE IDENTITIES," which claims priority to United Kingdom Application No. GB 0601403.9, filed 24 Jan. 2006, each of the foregoing of which is incorporated herein by reference in its entirety.

BACKGROUND

A number of standard radio specifications are currently being proposed for UWB radio communications. One example is the MBOA (MultiBand ODFM Alliance) specification.

At least some UWB specifications, such as MBOA, define a beacon signal that is transmitted at regular intervals. This beacon is used to help keep the radios of multiple devices synchronized and to allow additional devices to form a connection with the device transmitting the beacon. The beacon signal incorporates a number of items of information, including a local device address and a global device identifier. The local device address is negotiated locally with any other devices within listening range while the global device identifier remains constant and is globally unique to the device transmitting the beacon signal.

The local device address and the global device identifier are of different lengths; the longer, constant global address identifier is transmitted in the beacon to allow a device entering the network to determine which other device it wants to communicate with. It is essentially equivalent to a MAC address. For example, a mobile phone might want to connect to a printer and might know from past experience that the printer has a certain address. When the phone is brought into a UWB network, it could then look for the device having that address in order to perform printing. The global device identifier needs to be sufficiently long that all UWB devices operating according to the protocol can have their own unique global device identifier.

The local device address is shorter and is negotiated locally. It is used in packets within a frame (the sub-divided period between beacons) to identify which device that individual packet is from and/or which device it is addressed to. The reason for using a separate identifier from the global device identifier for this purpose is that the global address identifier is excessively long to use in every single data packet and would consume unnecessary bandwidth if it were used for this purpose. The local device address only needs to be sufficiently long that it can uniquely identify a device from the maximum number of devices than would practically be connected together at any one moment.

A UWB radio device operating in this way would be continuously transmitting its beacon signal. Since this signal contains a constant, unique identifier, the UWB-enabled device could be tracked by any interested party. This represents a loss of privacy for the owner of such a device. This is especially acute if the device in question is a personal mobile device (i.e., a device of the sort that a user might be expected to carry with them when they are out and about). Examples of such devices include mobile phones, digital cameras, music players, PDAs and watches.

BRIEF DESCRIPTION OF THE DRAWINGS

The present disclosure will now be described by way of example with reference to the accompanying drawings. In the drawings.

DETAILED DESCRIPTION

Figure 1:
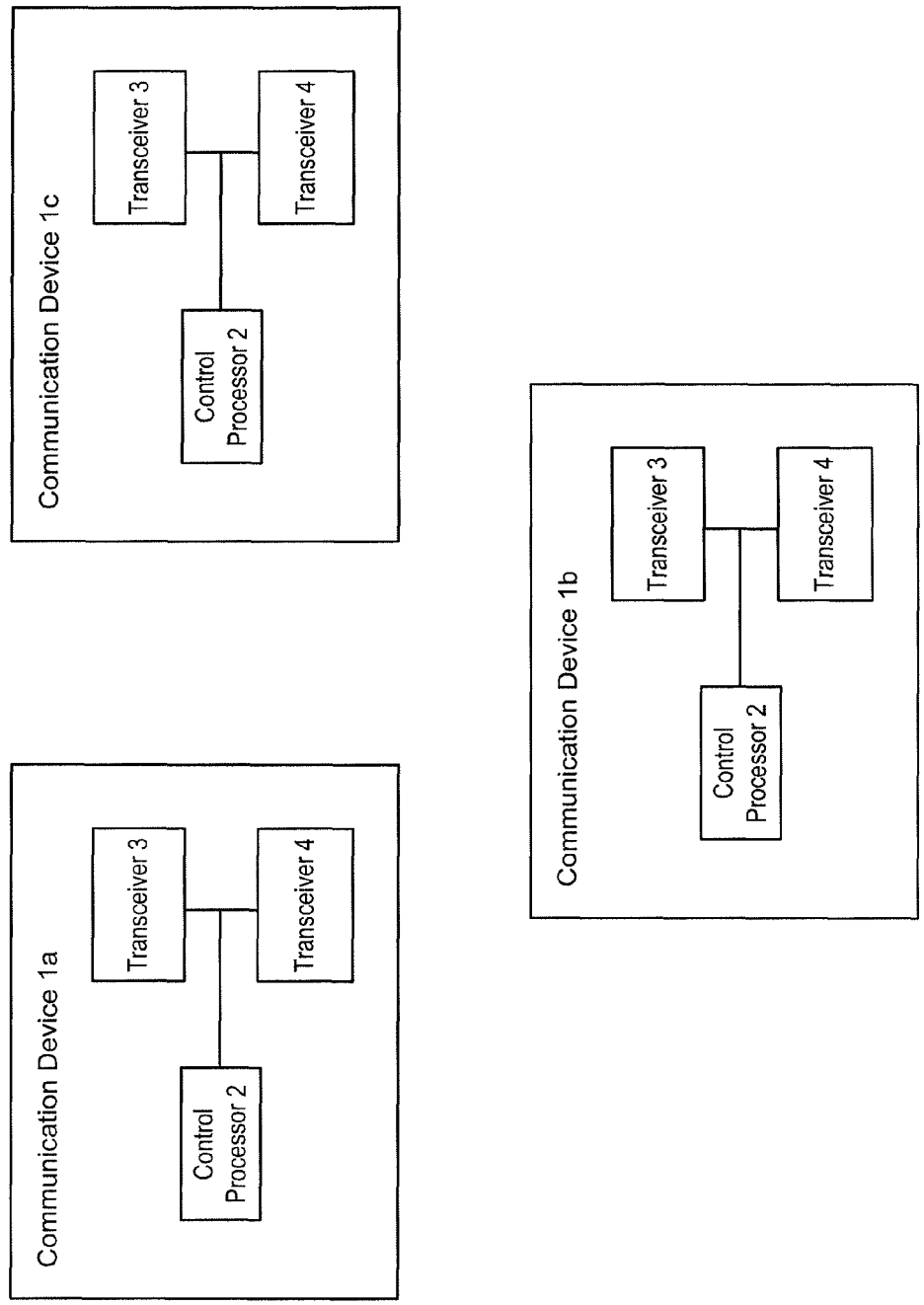
FIG. 1 shows a system including communication devices.

This disclosure relates to varying an identity by which a wireless communication device might be identified. Such an identity could be transmitted in beacon transmissions. The disclosure is applicable in one embodiment to ultra-wideband (UWB) radio systems.

The current roadmap of the Bluetooth specification envisages devices that are capable of communicating using both Bluetooth and ultra-wideband (UWB) radio. The UWB capability would supplement Bluetooth capability with a higher-bandwidth data path.

A communication device is disclosed herein that comprises: a memory for storing a device identity; a data transmitter for supporting communication links with other devices; a communication controller, the controller being configured to periodically vary the stored device identity and to cause the data transmitter to periodically transmit the stored device identity so that the device can be identified.

Also, disclosed herein is a method for communicating identity by means of a communication device comprising a memory for storing a device identity and a data transmitter for supporting communication links with other devices; the method comprising: periodically varying the stored device identity; and periodically transmitting the stored device identity so that the device can be identified.

The controller may be configured to vary the stored identity on establishment of a communication link between the device and another device.

The controller may be capable of communicating with another device by means of two protocols. The controller may be configured to periodically transmit the stored device identity in accordance with a first one of the protocols, and being configured to, in establishing a communication link in accordance with the first protocol with the other device, communicate with the other device by means of the second one of the protocols so as to negotiate with that device a device identity. It may be configured to newly store the negotiated device identity as the stored device identity, replacing a previously stored device identity.

The controller may be configured to vary the stored identity when a counter reaches a pre-set value. The counter may be a timer.

The controller may be configured to vary the stored identity by communicating with another device so as to negotiate with that device a device identity, and storing the negotiated device identity as the stored device identity.

The controller may store an algorithm for generating a device identity. The controller may be configured to vary the stored identity by calculating a device identity in accordance with the algorithm. It may be configured to store the calculated device identity as the stored device identity.

The controller and the transmitter may be configured to periodically transmit the stored device identity in an ultra-wideband beacon transmission.

In the example system described herein, a UWB device does not transmit a beacon signal that includes a globally constant identifier. Instead, it transmits an identifier that is generated dynamically. It may be exchanged in advance—in one embodiment over a secure channel—with other parties with which the device is to communicate. It may be re-calculated dynamically by the device and the other parties by means of an algorithm of which they all have knowledge.

FIG. 1 shows three communication devices 1a-c. Each device has a control processor 2 which is connected to a Bluetooth transceiver 3 and a UWB transceiver 4. The transceivers operate autonomously to carry out the basic protocol functions of each radio system, but function under the control of the control processor 2.

When devices 1a and 1b are to begin communication by UWB, they negotiate between them identification information that will be used by one of the devices in its beacon transmissions. They could negotiate identification information for both devices, if both devices might transmit beacon transmissions.

The identification information that is negotiated will depend on the UWB standard that is in use by the devices. It could, for example, be a locally-unique device address or a local network address. Sufficient identification information may be negotiated so that the system can function for UWB operation without the beacon transmissions of the device whose identification information is negotiated remaining constant. It may be an identifier that is not necessarily unique in the whole of the system in question.

The identification information may be negotiated before UWB communication is established between the devices, in which case it may be before the device whose identification information is negotiated has transmitted any UWB beacon transmissions. In this case, the information can be negotiated over a Bluetooth channel between the devices. A Bluetooth channel may also be used for negotiation even if the UWB channel is already set up. Alternatively, the information may be transferred by UWB after the UWB channel has been set up. In the latter case the device whose identification information is negotiated would use initial identity data for the establishment of the UWB channel, and then switch to using other identity data once the channel had been established and the information negotiated.

The identification information may be negotiated over a secure channel, so that the negotiation process cannot be tracked by third parties. The communications used for negotiation could, for instance, be encrypted. This security could be an inherent feature of the channel that is used for negotiation, or it could be overlain on the channel.

The negotiation process may operate in the following way. One device initiates negotiation by signaling the other device with a CHANGE_ID message of a predetermined form. Once that message is acknowledged by the other device the first device generates new identity data for itself and transmits that data to the other device as a parameter to a NEW_ID message of a predetermined form. When that message is received by the other device it stores the new identity data for use in communicating with the first device, and returns an acknowledgement message to the first device. Then, the first device starts using the new ID. If the first device is communicating with multiple other devices, then it carries out this process with all of them so that they are all aware of the new identity data.

The identity data can be selected randomly (including pseudo-randomly). If the identity data is sufficiently long, then the chance of it coinciding with the identity data of a nearby device will be very low. If that were to happen, then the first device could change its identity data again by the process described above. A similar process may be used to avoid collision on identical device addresses in a UWB system.

As indicated above, the current identity data for a device is incorporated in that device's UWB beacon transmissions. The system is such that those beacon transmissions are used by other devices for identifying the device and/or establishing a channel with it, and for identifying the device as a destination in transmissions. This means that a UWB-enabled device does not need to transmit a unique global identifier, but instead uses a potentially non-unique identifier that may vary with time. This means that the device can no longer be readily tracked and so enhances the privacy and security of that device and its owner.

The identification information could be re-negotiated periodically. Either device, and in one embodiment the device whose identification information is negotiated, may initiate re-negotiation of the information. Either device may be arranged to initiate re-negotiation of the information after a pre-set time period from the last negotiation. This makes it harder for third parties to track the identified device. The time period could, for example, be around 10 minutes.

The identification information could be varied without the need for negotiation. The devices could both be aware of an algorithm by which the identification information will be varied. For example, the identification information could vary as a function of system time, transmit counter or of the number of packets of data successfully communicated between the devices. In an embodiment, one arrangement is for identification information to be initially exchanged by negotiation, and to be subsequently varied algorithmically without negotiation over the communication interface between the devices. Alternatively, a device could start by using an initial identifier (for instance, a randomly chosen identifier), and that could be varied algorithmically in the same fashion as time goes on. The algorithm or parameters used in it could be passed between the devices, in one embodiment over a secure channel, so as to make it more difficult for a third party to track changes to the identification information.

In a manner of operation in one embodiment, an identifier is dynamically determined for a device in one of the ways described above at or before the point when it first establishes communication with any other device. Its identifier is then periodically changed in a way that allows other devices with which it is communicating to have knowledge of the device's new identifier. The device periodically transmits beacon transmissions that can be used by those other devices and by further devices that may want to establish communication with the device itself. The identifier is changed relatively infrequently compared to the times between beacon transmissions. Therefore, a newly connecting device can normally treat the device as having a constant beacon identifier when it wishes to connect. However, since the identifier is not constant over longer time periods the device itself cannot be tracked by third parties over a long time period. The device may also transmit one or more other identifiers, such as a local device address.

The means by which the new identifier for a device is determined may be such as to allow the other devices with which the device is communicating to have knowledge of the device's new identifier without other devices being readily able to determine the new identifier. To achieve this, the identifier may be set either by being determined by one device (most conveniently the device whose identity it is to be) and communicated directly to all the other devices with which it is currently communicating by means that are substantially secure from eavesdropping by third parties; or by being determined by that device in accordance with an algorithm at least some of whose parameters have been exchanged with those other devices in a similar way. In the latter case, a signal could be sent by the device to the other devices to inform them that its identity is changing, or the change of identity could occur in response to predetermined conditions such as a timer or other counter reaching a predetermined value.

In a practical implementation the transceivers (3, 4) of each device could be integrated into a single hardware unit, for instance on a common integrated circuit.

The disclosure is not limited to use with UWB or Bluetooth systems.

The present disclosure is advantageous when the identification information is negotiated out-of-band; that is over a different system or protocol from that in which it is to be used or applied. In that situation the system or protocol over which the information is transferred can have characteristics that make it more suitable for the transmission of the identification information than the system or protocol in which it will be used or applied. For example, the system or protocol in which the identification information is used may be one that has a higher data rate than the one over which it is negotiated. On the other hand, the system or protocol over which the identification information is negotiated may permit connections to be established more quickly, may use less power for communications, may have a longer range, may cause less interference to other systems, or may suffer less interference.

The devices may take any suitable form. Without limitation each device could, for example, independently be a notebook computer, a PDA (personal digital assistant), a mobile phone, a headset or a wireless LAN (local area network) access point. One or both devices could be a single integrated circuit. Such an integrated circuit could be incorporated into a device of the types listed above in order to provide those devices with the functionality described herein. The device whose identity is set dynamically, as described herein, may be a mobile device such as, for example, a portable device.

The protocol used between the transceivers for which an identity is set as described herein may be one according to which a device searches for a beacon transmission from another device in order to establish a communication channel with that device. It may be a protocol that includes no pre-set channel for use in exchanging information for use in channel establishment, such as a broadcast channel. It may be a protocol that does not provide for devices to act as base stations for the facilitation of the exchange of channel information between other devices for establishing a communication between those other devices. The device may have one or more other identities that are broadcast or otherwise transmitted. The device may be configured to also change those identities from time to time.

Each individual feature described herein may be used in isolation or in any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. Aspects of the present disclosure may include any such individual feature or combination of features. In view of the foregoing description it will be evident to a person skilled in the art that various modifications may be made within the scope of the disclosure.

The invention claimed is:

1. A communication device comprising:
a memory to store a device identity associated with a first radio system that identifies the communication device;
a data transmitter to support communication links with other devices; and
a communication controller configured to communicate using the first radio system and a second radio system, wherein the second radio system is different from the first radio system, the communication controller being configured to:
store an algorithm for varying the device identity;
send, via a secure channel, the algorithm or parameters used in the algorithm to another device;
negotiate the device identity with the other device, the negotiating performed out-of-band via the second radio system, and store the device identity in the memory;
periodically vary the stored device identity associated with the first radio system in accordance with the algorithm, wherein the varied stored device identity is not sent to the other device; and
communicate with the other device, via the first radio system, using the varied stored device identity.

2. A communication device as claimed in claim 1, wherein the communication controller is further configured to vary the stored device identity associated with the first radio system on establishment of a communication link in accordance with the first radio system between the device and another device.

3. A communication device as claimed in claim 1, wherein the communication controller is further configured to transmit the stored device identity associated with the first radio system to the other device in accordance with the first radio system.

4. A communication device as claimed in claim 1, wherein the communication controller is further configured to vary the stored device identity associated with the first radio system when a counter reaches a pre-set value.

5. A communication device as claimed in claim 4, wherein the counter is a timer.

6. A communication device as claimed in claim 1, wherein the communication controller and the transmitter are further configured to periodically transmit the stored device identity in an ultra-wideband beacon transmission in accordance with the first radio system.

7. A communication device as claimed in claim 1, wherein the second radio system is a Bluetooth radio system which operates according to a secure protocol.

8. The communication device of claim 1, wherein the first radio system is a Bluetooth radio system, and the second radio system is an ultra-wideband radio system.

9. The communication device of claim 1, wherein the communication controller is further configured to notify the other device that the device identity has been varied.

10. The communication device of claim 1, wherein the algorithm is for varying the device identity as a function of a system time, a transmit counter, or a number of packets of data successfully communicated between the communication device and the other device.

11. A method for communicating identity using a communication device comprising a memory to store a device identity associated with a first radio system that identifies the communication device and a data transmitter to support communication links with other devices, the method comprising:
- storing an algorithm for varying the device identity;
- sending, via a secure channel, the algorithm or parameters used in the algorithm to another device;
- negotiating the device identity with the other device, the negotiating performed out-of-band via a second radio system, and store the device identity in the memory;
- periodically varying the stored device identity associated with the first radio system in accordance with the algorithm, wherein the varied stored device identity is not sent to the other device; and
- communicating with the other device, via the first radio system, using the varied stored device identity.

12. The method of claim 11, wherein the first radio system is a Bluetooth radio system, and the second radio system is an ultra-wideband radio system.

13. The method of claim 11, further comprising notifying the other device that the device identity has been varied.

14. The method of claim 11, wherein the algorithm is for varying the device identity as a function of a system time, a transmit counter, or a number of packets of data successfully communicated between the communication device and the other device.

* * * * *